United States Patent
Klemo

(10) Patent No.: US 6,332,912 B1
(45) Date of Patent: Dec. 25, 2001

(54) METHOD TO LOWER THE FORMATION OF CLODS AND THE CLUSTERING TENDENCY OF REDUCIBLE IRON CONTAINING AGGLOMERATED MATERIAL, IN PARTICULAR PELLETS

(75) Inventor: Roger Klemo, Kiruna (SE)

(73) Assignee: Luossavaara-Kiirunavaara AB (LKAB), Lulea (SE)

( * ) Notice: Subject to any disclaimer, the term of this patent is extended or adjusted under 35 U.S.C. 154(b) by 0 days.

(21) Appl. No.: 09/381,166
(22) PCT Filed: Jan. 14, 1999
(86) PCT No.: PCT/SE99/00041
  § 371 Date: Nov. 16, 1999
  § 102(e) Date: Nov. 16, 1999
(87) PCT Pub. No.: WO99/39014
  PCT Pub. Date: Aug. 5, 1999

(30) Foreign Application Priority Data

Feb. 2, 1998 (SE) .................................................... 9800292

(51) Int. Cl.⁷ .................................................. C22B 1/216
(52) U.S. Cl. ............................ 75/765; 427/212; 427/215; 427/242
(58) Field of Search ............................ 75/765, 319, 759; 427/212, 215, 242

(56) References Cited

U.S. PATENT DOCUMENTS

| | | |
|---|---|---|
| 4,241,692 | 12/1980 | Van Hijfte et al. . |
| 5,372,628 | 12/1994 | Steeghs . |
| 5,476,532 | * 12/1995 | Steeghs ...................................... 75/300 |
| 5,721,012 | * 2/1998 | Long, Jr. et al. ..................... 427/212 |

FOREIGN PATENT DOCUMENTS 1236974A  6/1971 (GB) .

OTHER PUBLICATIONS

Derwent's Abstract: No. 83–34085K/14, week 8314, May 30, 1982.

Derwent's Abstract: No. 97–403073/38, week 9738, Aug. 5, 1997.

* cited by examiner

Primary Examiner—Roy King
Assistant Examiner—Tima McGuthry-Banks
(74) Attorney, Agent, or Firm—Birch, Stewart, Kolasch & Birch, LLP

(57) ABSTRACT

The invention relates to a method for reducing the formation of clods and the clustering tendency of reducible iron-containing agglomerated material, particularly so-called pellets, whereby the reducible iron-containing agglomerated material, following a desulfurization process that takes place after a sintering process during the manufacture of the pellets, is given an outer layer of clustering-reducing material in the form of a liquid suspension of particulate material. According to the invention, a more even distribution of the coating on the surface of the agglomerate is achieved in that the application of the liquid suspension takes place during tumbling in a drum that is designed so that the agglomerate together with the liquid suspension can essentially pass freely through it.

13 Claims, 1 Drawing Sheet

METHOD TO LOWER THE FORMATION OF CLODS AND THE CLUSTERING TENDENCY OF REDUCIBLE IRON CONTAINING AGGLOMERATED MATERIAL, IN PARTICULAR PELLETS

This application is the national phase under 35 U.S.C. § 371 of PCT International Application No. PCT/SE99/00041 which has an International filing date of Jan. 14, 1999, which designated the United States of America.

BACKGROUND OF THE INVENTION

The present invention relates to a method to lower the formation of clods and the clustering tendency of reducible iron-containing agglomerated material, particularly so-called pellets.

Extracting metallic iron takes place, among other means, by the direct reduction of iron oxide in a direct reduction furnace according to the so-called DR process, whereby the iron oxide, commonly in an agglomerated and concentrated form, preferably the form of so-called pellets, continuously moves down through the shaft of the furnace during the so-called charging of the furnace where it meets a reducing gas with a temperature of about 800–950° C. The reducing gas reduces the iron oxide so that metallic iron, the so-called iron sponge, is obtained, which can then be fed out in the lower part of the furnace. Since the reactivity of the iron oxide increases with increased temperature, a raised reduction temperature is generally desirable as this leads to a quicker reduction process and thus increased speed of production.

The disadvantage of a higher reduction temperature is that the iron-containing reducible agglomerates in the furnace show a greater tendency to form clods and stick together and form ever larger agglomerates, so-called clusters. These clusters slow down the reduction process since they hinder the flow of gas and materials, which in turn leads to a lower speed of production and a final product with a comparatively lower quality.

In an effort to increase the production yield or production value during the reduction process today, an increasingly larger amount of reducible raw material of very high purity, i.e. raw material preferably with very low quantities of silicon, is being used. However, the high iron content of the reducible material also contributes to increased formation of clods and a tendency to cluster in the reducible material.

There is thus a desire to reduce the clod formation and the tendency to cluster in the reducible iron-containing raw material that is used in the reduction process, and consequently even the possibility to raise the temperature at which the reduction process takes place. Experience from operating processes has shown that increasing the reduction temperature during direct reduction by 100° C. allows an increase in the speed of production of the iron sponge by 25%, at the same time as the specific consumption of gas can be held essentially constant.

Until now, the commonest solution to the problem of cluster formation during the direct reduction of oxidizing iron-containing material has been to lower the temperature of the reduction process, which is not an acceptable solution from a production point of view. Another way to avoid clusters is to reduce the iron content of the reducible agglomerates. However, this is not an acceptable solution either as it also leads to a lower production yield during the reduction process and the production of iron.

Within the technology, it is also well known to solve the problem by so-called "coating", i.e. coating the outside of the reducible iron-containing agglomerates with a protective layer of a non-iron material, a so-called coating material, that hinders the agglomerates from coming into metallic contact with one another during the reduction process. These non-iron materials should have a small particle size so that they easily adhere and completely or at least mostly cover the surface of the agglomerates, and have a melting temperature that exceeds the temperatures found during the reduction process by a considerable margin. The said non-iron materials commonly consist of limestone, lime, dolomite, and thus of material that does not harden on contact with water, and that in particle form and when forming part of a liquid suspension, a so-called slurry, is applied to the iron-containing agglomerates as a final step in their chain of manufacture.

As experience has shown that all handling of the coated agglomerates up to the charging of the furnace for reduction affects the degree of coverage of the applied coat in a negative manner, and that this should therefore be avoided, the coating of the iron-containing agglomerates has so far been carried out as late as possible in the chain of manufacture, and in such a way that the number of points of contact and the internal movement of the agglomerates relative to one another is restricted as far as possible.

In an effort to achieve this today, the coating is usually applied as the final step in the chain of manufacture of the reducible agglomerates, i.e. after the sintering and the following desulphurisation of the agglomerate. So far, the application of a coating on the agglomerates has, for example, been carried out by spraying and hosing with a coating material in slurry form directly onto the agglomerate while this is located on a conveyor, such as an endless conveyor belt or similar. Studies have shown that with this technique, only about ⅓ of the agglomerates acquire what can be considered to be an acceptable degree of coating. Another technique for coating agglomerates that has recently be practised to an increasing extent is the utilization of a drop or descending shaft, whereby the coating is applied by spraying or hosing with a coating material in slurry form from different directions while the said agglomerates fall freely through the air. Even if these means to a large extent avoid the particles coming into unnecessary contact with one another during and after the coating, the method has not been shown to provide the even and continuous overall coating of the agglomerates that is normally needed to prevent clustering in the reduction process. In particular, this is probably due to the falling agglomerates wholly or partially covering one another during the spraying process. Those attempts that have so far been made to solve this problem have mainly been focused on increasing the amount of space between the agglomerates and their distribution during the actual spraying process, in combination with increasing the height of the fall and arranging further hosing nozzles along the moving flow path of the agglomerates. However, these measures have not produced the sought after results with regard to the degree of coverage of the coating. In practice, it has been shown that dust and particles given off by the free-falling agglomerates tend to block the hosing nozzles, in particular those nozzles the lower part of the flow path and that are thus located closest to the landing place of the agglomerates.

There has long existed a desire to be able to improve the degree of coverage and quality when coating iron-containing agglomerates with fluxing material and maintain a high speed of production, and the objective of the present invention is to achieve a method that realises this desire. This objective of the invention is realised by it having the features and characteristics specified in the claims.

The use of a drum to apply a coating of a fluxing substance to an agglomerate is certainly known from U.S. Pat. No. 3,975,182, but it should be pointed out that even though the use of a drum is mentioned in this document, the intention of using it is not as in the present invention, namely as a final manufacturing step to as quickly and effectively as possible apply a protective fluxing substance in the form of a liquid suspension, a so-called slurry, to a formed reducible agglomerate, but to utilize a traditional rotating procedure in a rotating drum to apply a layer of fluxing substance on a so-called green body. Regarding this, it can be mentioned that the formation of so-called green bodies generally takes place when primary cores of particulate materials are, like snow balls, rolled-up layer-by-layer in a rotating drum that has a bed of moist, fine grain iron-containing material and where growth takes place as a result of the effect of adhesion. According to the said document, the same principle is used to apply the green body formed with one or more layers of fluxing substance, for example, limestone, by rotation in a complementary rotating drum that has a bed of moist fluxing material. In subsequent steps, the coated green bodies are dried and baked, whereby the fluxing substance is transformed to form a hard outer shell-like ferrite coating of calcium ferrite in those cases where the applied coating initially included lime or limestone.

U.S. Pat. No. 4,241,692 describes a device with a rotating drum with spray nozzles arranged inside for coating the surface of pellets or similar. The drum has an inlet and an outlet with essentially restricted openings and is equipped along its length with a number of spaces that are separated from one another by dividing walls projecting outwards within the drum where the said spaces are only joined with one another via apertures arranged in the said dividing walls.

BRIEF DESCRIPTION OF THE DRAWINGS

The invention is described in greater detail below with reference to the enclosed drawing.

DETAILED DESCRIPTION

Figure 1:
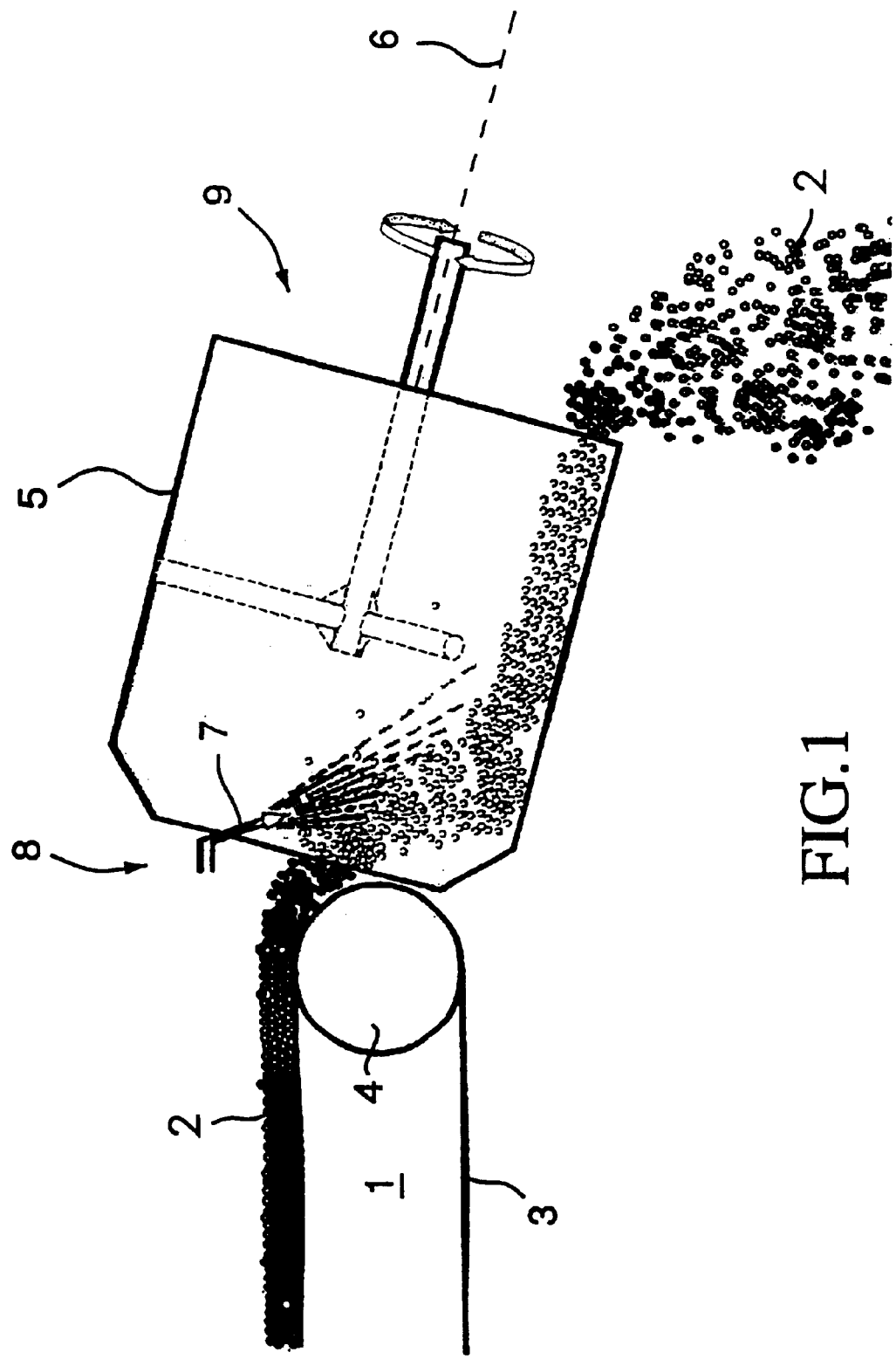
FIG. 1 schematically shows a side view of an X-ray-like image taken through a device for performing the method according to the present invention.

In accordance with the principles that form the basis of the present invention, a device for performing the invention includes in the embodiment as shown in FIG. 1, a primarily horizontally oriented conveyor 1 for transporting the essentially desulphurised reducible iron-containing agglomerate 2. The said conveyor primarily consists of an endless solid belt 3 that runs around wheels 4, only one of which is shown in FIG. 1. In the feed-out area of the endless conveyor belt 3, there is an essentially cylindrical drum 5, open at both ends, with an essentially smooth inside and that, in a suitable known manner, is arranged to be driven so that it rotates around its main axis, designated 6. At one end of the drum, a set of spraying or hosing nozzles 7 are arranged that are in principle angled downwards towards the bottom of the drum and that are connected via a pumping device (not shown in the figure) to a tank (also not shown in the figure) containing a liquid suspension or so-called slurry comprising the coating material and water.

As is evident from FIG. 1, the drum 5 is arranged and oriented in relation to the said feed-out area so that agglomerate 2 arriving at the drum spreads out and falls down in one of the openings 8 of the drum and, during rotation, is essentially free to move towards the other end 9 of the drum. This tumbling movement of the agglomerate within the drum 5 is achieved in that the main axis 6 of the drum is oriented at a slight angle to the feed-out end of the belt where the angle is chosen so that piling up of the agglomerate is prevented at the same time as the agglomerate 2, during the tumbling in the drum, effectively receives an application of the said liquid suspension of the coating substance.

Finally, the tumbled and coated agglomerates flow together with the excess liquid suspension down into a container (not shown in the figure) for collection and further transport to a plant for manufacturing iron. As the said excess from the coating is also transported in the collection container, the advantage of having a moist coating applied to the agglomerate is retained, which contributes to the adhesion effect, i.e. the ability of the outside of the agglomerates and the particles to stick to one another, being maintained.

Through the invention, it is possible to achieve a very effective and essentially full degree of coating of reducible agglomerates and the superior characteristics of the agglomerates according to the method according to the invention in comparison with agglomerates coated by spraying or hosing are illustrated by analyses performed as in the example below.

The tests described below were performed in a laboratory environment whereby the coating was applied in line with the principles for the invention, more specifically, by hosing the agglomerate with a "slurry"(comprising 20% solids/80% water) in a rotating drum. In the tests, the sample of agglomerate was covered with a constant amount of "slurry" in relation to the amount of sample: 0.2% solids (equivalent to 2 kg solid coating per 1000 kg agglomerate).

Following the coating, the clustering behaviour of standard DR pellets MPRD was assessed according to the so-called HYL standard, whereby 1.2 kg of sample is reduced to metallic iron at 950° C. in a packed bed under a load of 15 Mpa. The sample is cooled and the metallized sinter composite blank is subjected to a destruction test, which means that it is dropped 20 times from a height of 1 metre, after which the number of blanks that are whole single units is measured after every fall. The clustering index can be calculated on the basis of these observations, whereby 100% means maximum clustering and 0% means no measurable clustering.

Clustering values for non-coated pellets and the clustering tendency when coated with different known and commonly used fluxing materials are evident from the table below.

Laboratory test

MPRD pellets covered with 0.2% coating (2 kg/ton pellets) in the drum

Cluster index according to the HYL standard clustering test (950° C).

| Table of clustering index | No coating | Coating in the drum |
| --- | --- | --- |
| Reference: MPRD | 81.7 | |
| Non-coated | 73.3 | |
| Coated with mineral A | | 32.9 |
| Coated with mineral B | | 7.2 |
| Coated with mineral C | | 10.6 |
| Coated with a mixture of A and C | | 4.6 |
| Coated with a mixture of B and C | | 4.7 |

Operational results

MPRD pellets covered with 0.2% coating (2 kg/ton pellets) in the drum

The table shows a comparison between the application of coating material by conventional spraying and the application of coating material by tumbling in the drum according to the invention. The tests of the clustering index show mean values taken after long-term follow-up and after normal handling of the pellets from the manufacturing plant to the plant of iron manufacturing, partly including transport by train (train samples) and partly transport by boat (boat samples).

Cluster index according to the HYL standard clustering test (950° C.).

| Table of clustering index | No coating | Coating by spraying | Coating in the drum |
|---|---|---|---|
| Reference: MPRD | | | |
| Clustering train sample | 74 | 37 | 23 |
| Clustering boat sample | 74 | 49 | 30 |

The results show very good values with regard to coating reducible agglomerates in the form of so-called pellets with non-iron-containing fluxing material according to the principles of the invention. The idea is as simple as it is ingenious, namely to spray or hose a liquid mixture of fluxing substance onto pellets while they roll inside a drum to achieve a better and more complete coating than has been possible until now with conventional techniques. Due to the unhindered free fall movement forwards through the drum, a continuous and high speed of production can thus also be maintained at the same time.

The invention is not limited to that described above and shown in the drawing, but it can be changed and modified in a number of different ways within the scope of concept of the invention as specified in the following claims.

What is claimed is:

1. A method for reducing clustering and clod formation, which comprises:
    providing reducible iron-containing agglomerated material;
    sintering the agglomerated material;
    desulfurizing the agglomerated material; and
    forming an outer layer of cluster reducing material on the agglomerated material,
    the forming of the outer layer being performed by applying a liquid suspension of particulate material to the agglomerated material, the applying taking place by tumbling in a drum, the drum being designed so that the agglomerated material and the liquid suspension pass freely through the drum.

2. The method of claim 1, wherein the drum is open at both ends.

3. The method of claim 1, wherein the drum has a smooth inside.

4. The method of claim 1, wherein applying the liquid suspension takes place within the drum using spray nozzles or hose nozzles arranged in the drum.

5. The method of claim 2, wherein the drum has an axis of rotation arranged at an angle to a feeding-out end of a device for transporting the agglomerated material, and the angle is chosen so that the agglomerated material from the feeding-out end is allowed to fall freely into an inlet end of the drum and pass out through the other end of the drum.

6. The method of claim 5, wherein the device for transporting the agglomerated material is a continuous belt.

7. The method of claim 4, wherein the spray nozzles or hose nozzles are arranged in an area of the inlet end of the drum, the liquid suspension being applied to agglomerated material that is falling freely inside the drum so that the agglomerated material is separated.

8. The method of claim 1, wherein the agglomerated material comprises pellets.

9. The method of claim 1, wherein the liquid suspension is a slurry comprising water and solids.

10. The method of claim 9, wherein the slurry comprises about 80% of the water and about 20% of the solids.

11. The method of claim 9, wherein the solids comprise non-iron material that does not harden on contact with water.

12. The method of claim 9, wherein the solids comprise a material selected from the group consisting of limestone, lime and dolomite.

13. The method of claim 9, wherein the solids cover the agglomerated material at a ratio of about 2 kg solids to 1000 kg of agglomerated material (0.2% solids).

* * * * *